Patented Nov. 17, 1936

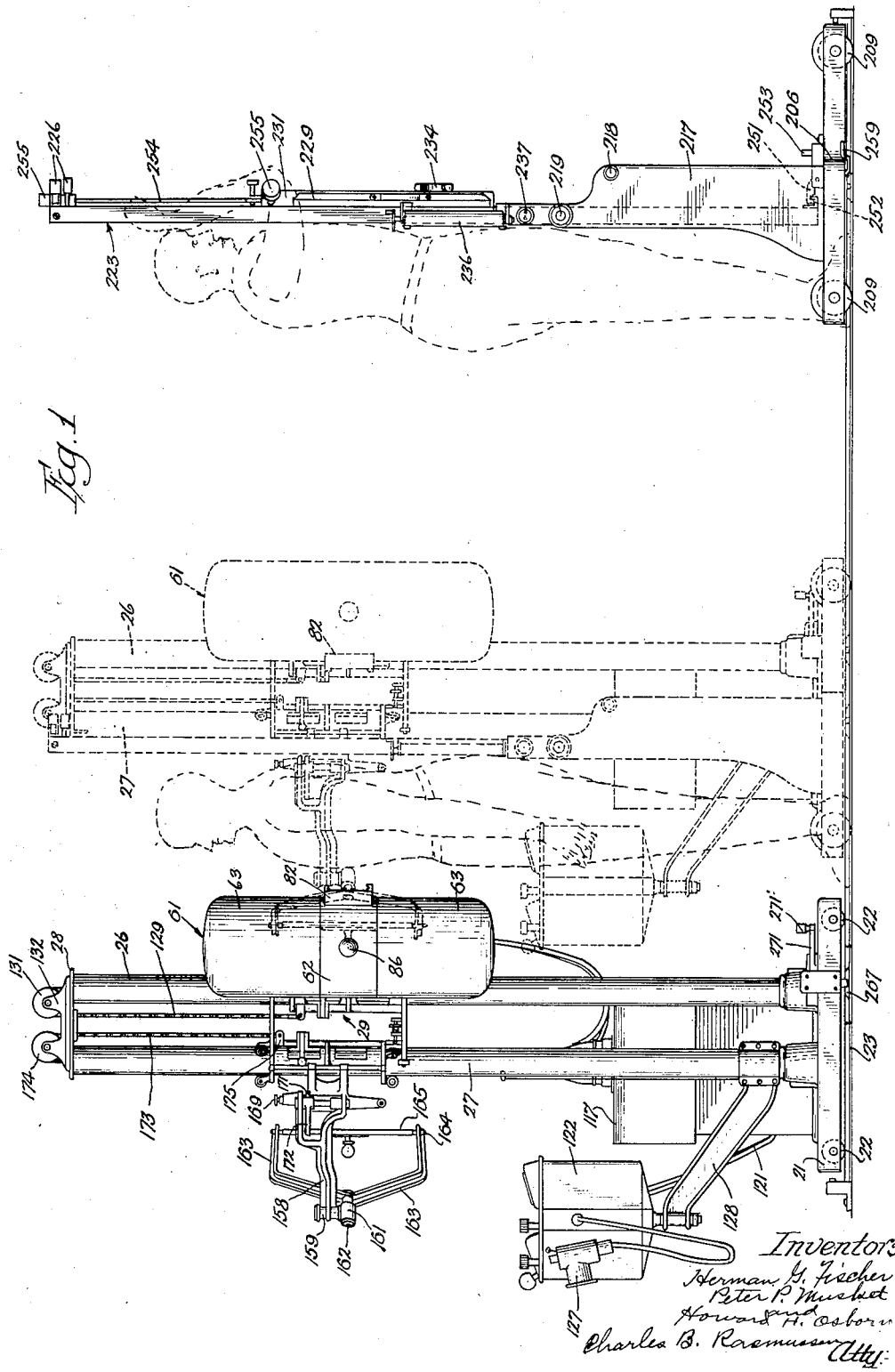

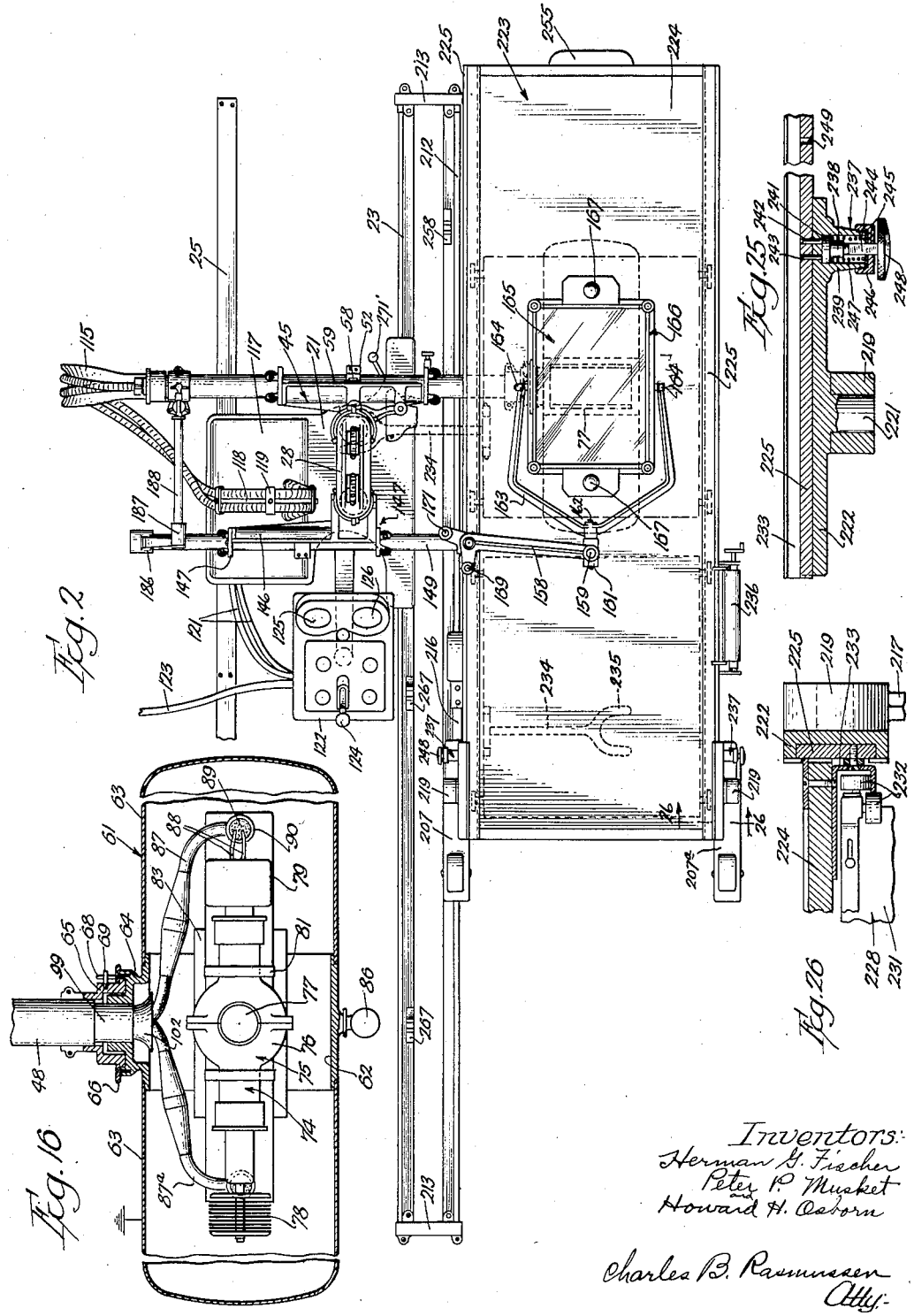

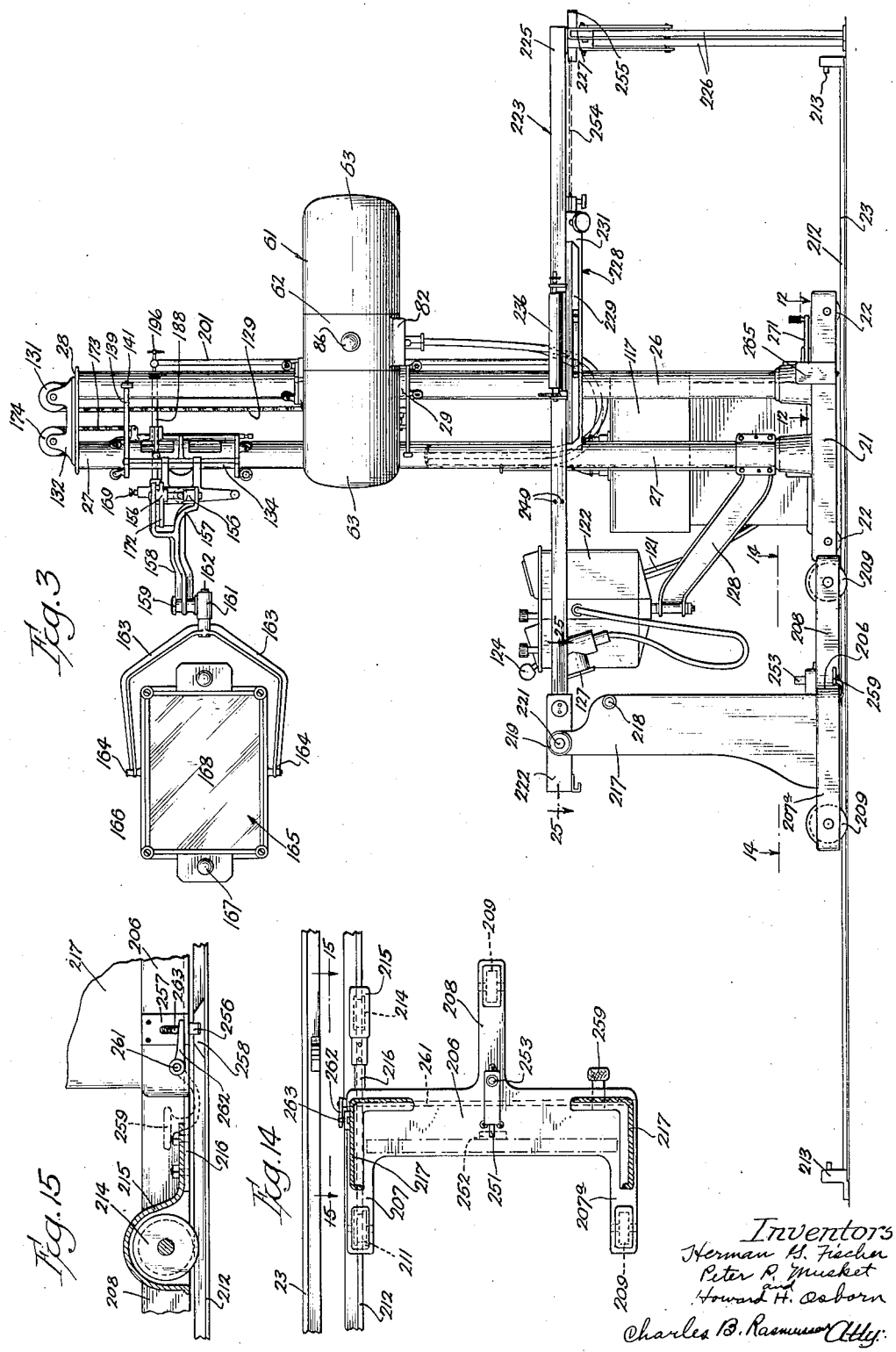

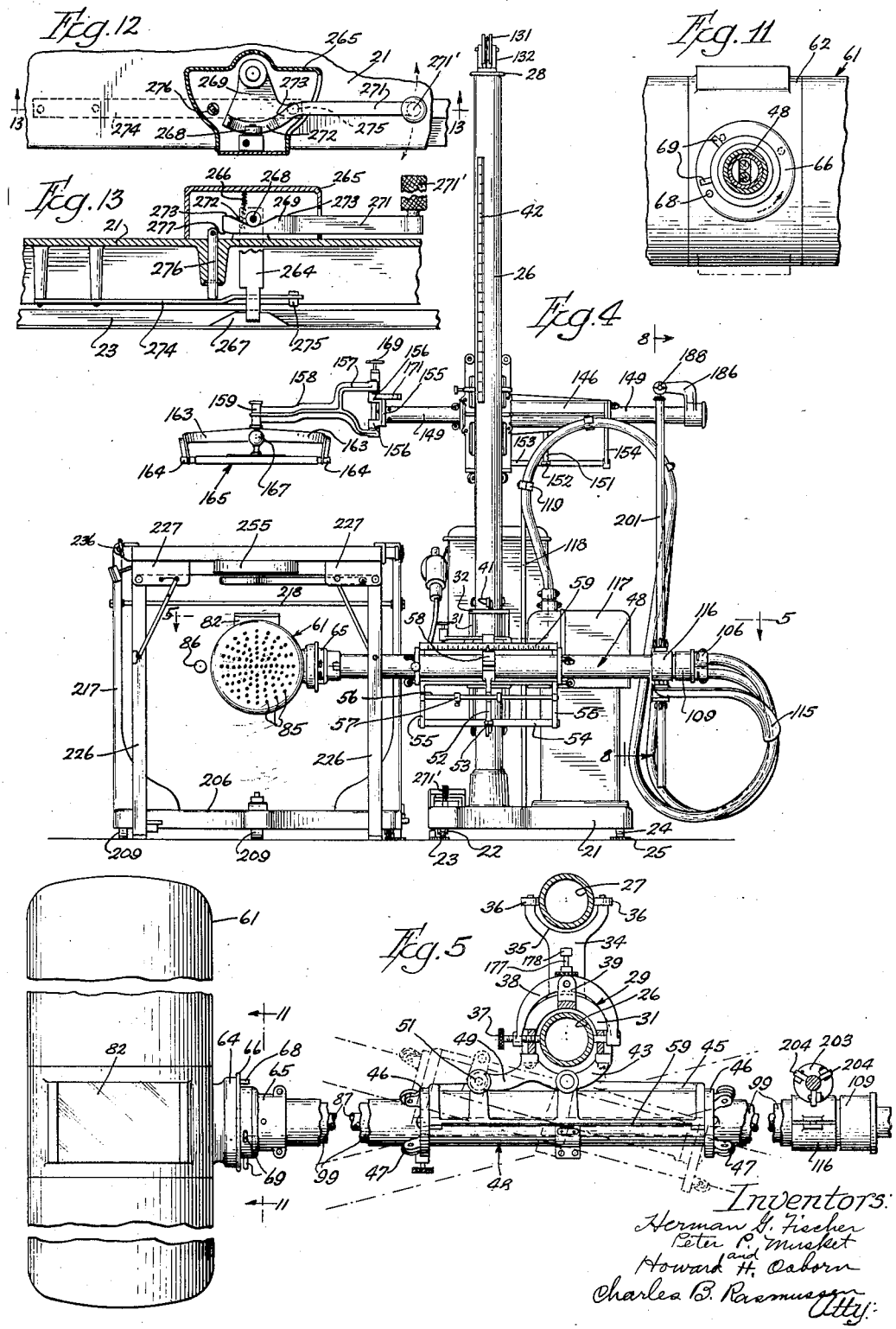

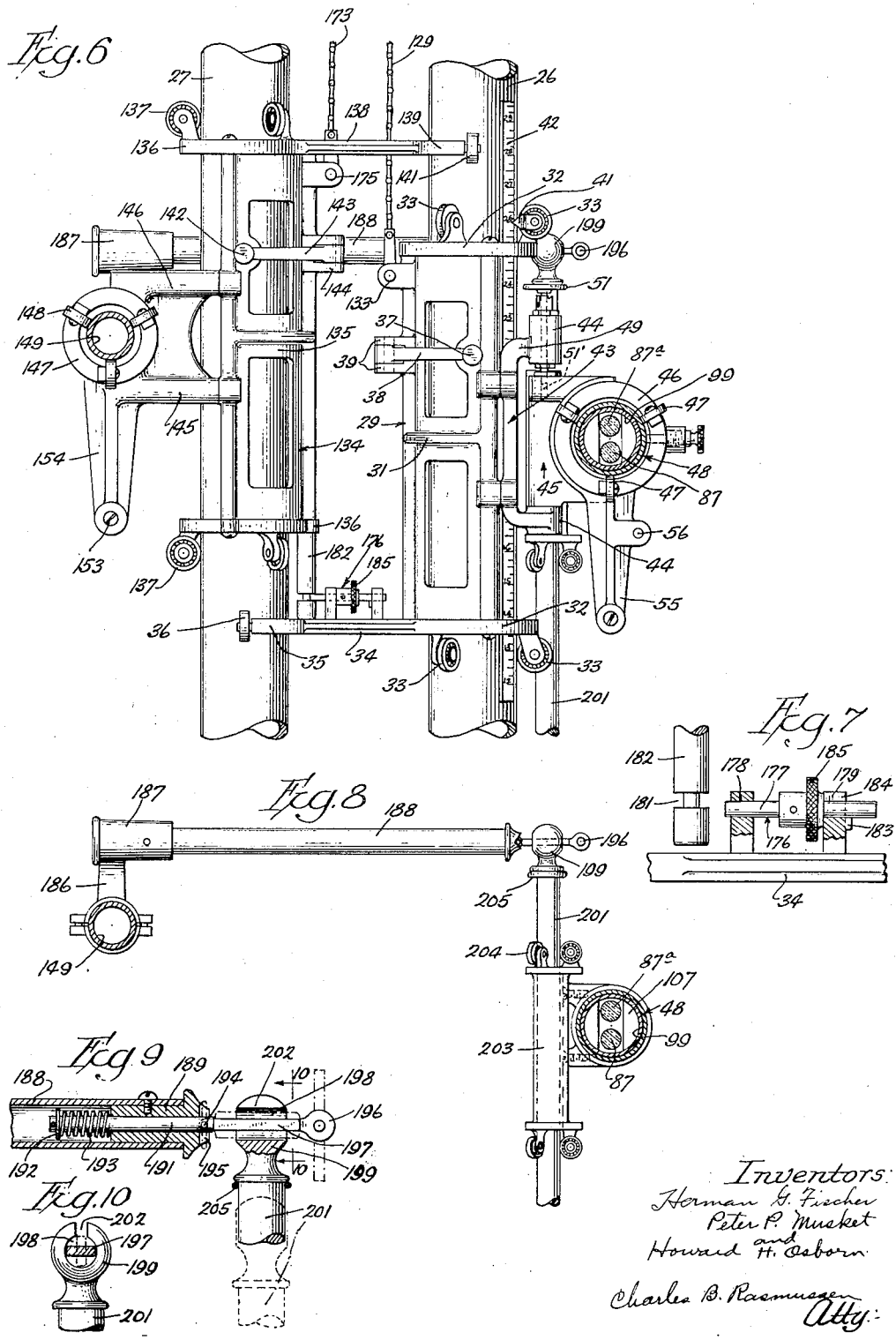

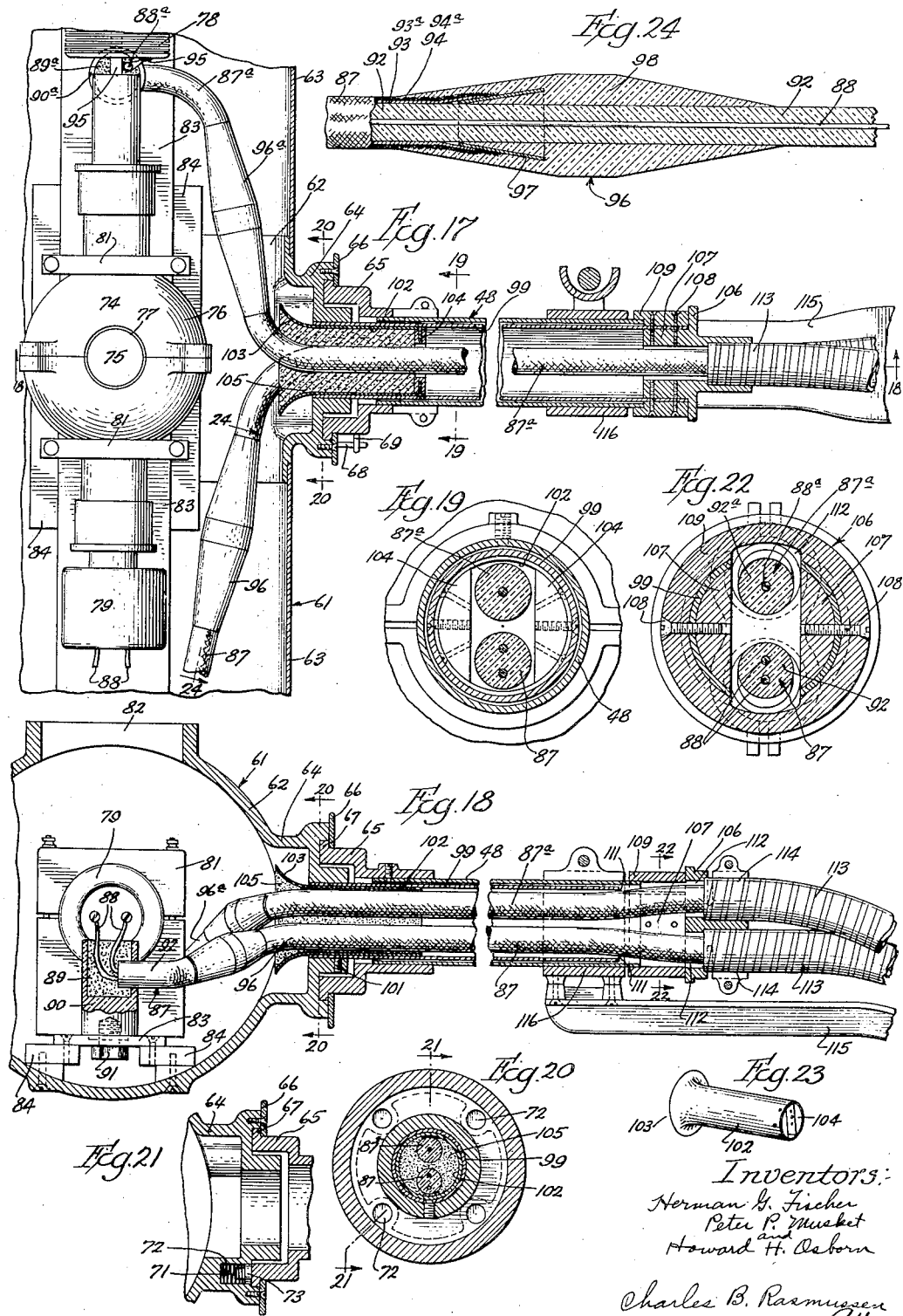

2,060,981

UNITED STATES PATENT OFFICE 2,060,981

COMBINED X-RAY AND FLUOROSCOPIC APPARATUS

Herman G. Fischer, Peter P. Musket, and Howard H. Osborn, Chicago, Ill., assignors to H. G. Fischer & Company, Inc., Chicago, Ill., a corporation of Illinois Application December 7, 1933, Serial No. 701,300

19 Claims. (Cl. 250—34)

This invention relates in general to a combined X-ray and fluoroscopic apparatus. While the invention will hereinafter be described as embodied in an X-ray and fluoroscopic apparatus, it will readily be appreciated that it has valuable and advantageous use in other related apparatus.

A principal object of the invention is the provision of a combined X-ray and fluoroscopic apparatus which employs but a single X-ray tube which is so mounted as to be capable of adjustment to many positions in order to permit of both fluoroscopic and radiographic examination of the entire human body when the patient occupies either a standing or a recumbent position.

Another important object of the invention is the provision of mechanism for interlocking the X-ray unit and the fluoroscope so as to be movable in unison in one direction, and independent means for also interlocking these instrumentalities for movement in a transverse direction, thus facilitating examination of any or all portions of the subject.

A further important object of the invention is the provision of a fluoroscope which is mounted for swinging movement about a plurality of axes extending transversely to one another to permit the same to be moved to various adjusted positions for both vertical and horizontal fluoroscopic examination.

A still further important object of the invention is the provision of means for mounting the cables supplying the X-ray tube with electric current so that they cannot become twisted to such an extent as to injure the insulation thereof when the X-ray unit is turned to its several positions of adjustment.

Another important object of the invention is the provision of an apparatus of the character described which may be adjusted vertically and horizontally to any desired position for use in both radiography and fluoroscopy, and in which the various movable parts are provided with antifriction and counterbalancing devices so as to require little effort on the part of the operator in shifting such parts to their desired positions.

A further object of the invention is the provision of an apparatus of the character described, compact in construction, and in which certain parts thereof may be folded up so that it occupies minimum space when not in use.

A still further object of the invention is the provision of an apparatus of the character described which is easily portable and which can be mounted on casters or the like for use in a sick room or be adjustably installed on rails for use in an office or laboratory.

Another object of the invention is the provision of a novel base construction having a three point support for insuring extreme stability and rigidity notwithstanding irregularities in the floor over which the apparatus may be moved.

A further object of the invention is the provision of novel locking devices for maintaining the apparatus in its desired adjusted position on the floor as well as the various adjustments between the several parts thereof.

A still further object of the invention is the provision of an X-ray apparatus in which the several cables for conducting electric current thereto are provided with means for protecting the cables against the development of a surface corona and resultant breakdown of the cables adjacent their terminals, thereby eliminating all danger of sparking and resultant noise.

Another object of the invention is the provision of an apparatus of the character described which is so constructed as to prevent an operator or other person from inadvertently receiving an electric shock by the dangerously high voltage required in the operation of such an apparatus.

Numerous other objects and advantages of the invention will be apparent as it is better understood from the following description, which, when taken in connection with the accompanying drawings, illustrates a preferred embodiment thereof.

Referring to the drawings:

Figure 1 is a front elevation of a combined X-ray and fluoroscopic apparatus constructed in accordance with the present invention, and with the several instrumentalities adjusted for upright chest radiography illustrated in full lines, and adjusted for upright chest fluoroscopy in dotted lines;

Fig. 2 is a plan view of the apparatus in position for horizontal fluoroscopy;

Fig. 3 is a front elevation of the apparatus adjusted for horizontal radiography;

Fig. 4 is an end elevation of the apparatus adjusted for horizontal fluoroscopy;

Fig. 5 is an enlarged view, partly in plan and partly in section, taken substantially on line 5—5 of Fig. 4;

Fig. 6 is an enlarged fragmentary front elevation of the vertically adjustable carriages for supporting the X-ray unit and fluoroscopic device;

Fig. 7 is an enlarged detail view of the mechanism for interlocking the X-ray unit and fluoroscopic device supporting carriages;

Fig. 8 is enlarged detail view, partly in front elevation and partly in section, taken on line 8—8 of Fig. 4, but with the parts in a position similar to that disclosed in Fig. 6;

Fig. 9 is an enlarged sectional view of the means for detachably securing the rods which interlock the supports for the X-ray unit and the fluoroscopic device for horizontal movement in unison;

Fig. 10 is a vertical section taken on line 10—10 of Fig. 9;

Fig. 11 is a vertical section taken on line 11—11 of Fig. 5;

Fig. 12 is a horizontal section taken on line 12—12 of Fig. 3;

Fig. 13 is a vertical section taken on line 13—13 of Fig. 12;

Fig. 14 is a horizontal section taken on line 14—14 of Fig. 3;

Fig. 15 is a vertical section taken on line 15—15 of Fig. 14;

Fig. 16 is an enlarged longitudinal section through the X-ray unit;

Fig. 17 is an enlarged fragmentary horizontal section through the X-ray tube support and illustrating the mechanism for supporting the current supplying cables against twisting;

Fig. 18 is a vertical longitudinal section taken on the line 18—18 of Fig. 17, the current supplying cables being shown in elevation;

Fig. 19 is a vertical section taken on line 19—19 of Fig. 17;

Fig. 20 is a vertical section taken on line 20—20 of Fig. 17;

Fig. 21 is a longitudinal step section taken on line 21—21 of Fig. 20;

Fig. 22 is a vertical section taken on line 22—22 of Fig. 18;

Fig. 23 is a perspective view on a smaller scale of the spun sleeve element for containing the sealing wax which maintains the current supplying cables immobile, as against relative twisting movement in the vicinity of the X-ray tube;

Fig. 24 is an enlarged longitudinal section taken on line 24—24 of Fig. 17, showing the construction of a stress cone for eliminating stress in the vicinity of the terminals of the X-ray tube;

Fig. 25 is an enlarged longitudinal section taken on line 25—25 of Fig. 3; and

Fig. 26 is a vertical section taken on line 26—26 of Fig. 2.

A combined X-ray and fluoroscopic apparatus embodying the present invention is shown in the drawings comprising an X-ray unit support having a base 21 of hollow cast construction provided with a pair of grooved rollers 22 at one side for engagement with a flanged track rail 23 secured to the floor, and with a single smooth faced roll 24 at the other side thereof for engagement with a flat track rail 25 also secured to the floor in spaced parallel relation to the rail 23 (Fig. 4). The base 21 carries a pair of vertically extending, parallel tubular standards 26 and 27 which are connected at their upper ends by a plate 28, and which, respectively, carry the X-ray unit and the fluoroscopic device hereinafter to be described.

Mounted on the standard 26 for vertical adjustment is a carriage, indicated generally at 29 in Figs. 5 and 6, which includes in its construction a hemicylindrical casting 31 having guide rings 32 secured to its upper and lower ends, which encircle the standard 26 and which are provided with a plurality of spaced rollers 33 for rolling engagement with the standard in order to reduce friction when the carriage is moved. The carriage 29 is prevented from rotating on the standard 26 by means of a horizontally extending arm 34 provided on the lower guide ring 32, bifurcated at its outer end at 35, and provided with antifriction rollers 36 for engagement with the opposite sides of the standard 27. The carriage 29 may be releasably secured to the standard 26 in any adjusted position by means of a clamping screw 37 which is threaded into one arm of a semicircular member 38 which straddles the standard 26 and is pivotally mounted intermediate its ends between ears 39 formed on the casting 31. When the screw 37 is tightened the standard 26 will be engaged between this screw and the oppositely disposed arm of the member 38, the position of the member automatically accommodating itself to the movement of the screw by reason of its pivotal mounting. An indicator 41 is provided on the bearing of one of the antifriction rollers 33 and cooperates with a graduated scale 42 carried by the standard 26 to indicate the amount of movement imparted to the carriage 29 and the parts carried thereby.

Secured to the casting 29 is a bracket 43 formed with spaced upper and lower bearings 44 between which a half cylindrical guide casting 45 is pivoted for a limited amount of horizontal swinging movement, as shown in broken lines in Fig. 5. Guide rings 46 are secured to the opposite ends of the casting 45 and are provided with anti-friction rollers 47 for engagement with a tubular longitudinally movable X-ray unit support 48 which extends horizontally through the rings 46 and guide castings 45, but in spaced relation to the latter. The bracket 43 is also formed with an arm 49 which carries a spring pressed locking pin 51 for engagement with a notch or recess 51' provided in the guide casting 45 in order to releasably maintain the parts in the position shown by full lines in Fig. 5, but which may be disengaged therefrom in order to swing the guide casting 45 and the parts carried thereby to the position indicated by the broken lines in this figure.

The tubular support 48 is prevented from rotating axially by means of a downwardly extending arm 52 (Fig. 4), the upper end of which is fixed to the support 48 between the guide rings 46 and the lower end of which is bifurcated and provided with antifriction rollers 53 for engagement with the opposite sides of a stationary guide bar 54 fixed at its ends to depending arms 55 carried by the guide casting 45. A horizontally extending rod 56 is supported at its ends in the arms 55 and is provided with a pair of stops 57 arranged in fixed spaced relation relative to one another for engagement with opposite sides of the arm 52. These stops are adapted to limit the amount of longitudinal movement of the X-ray support 48 when it is desired to obtain two radiographs for stereoscopic purposes. An indicator 58 may be provided on the upper end of the arm 52 (Fig. 4) and co-operates with a graduated scale 59 carried by the guide casting 45 to indicate accurately the amount of longitudinal movement of the support 48.

Mounted on one end of the tubular support 48 is a protective hood or grounded shield, indicated generally at 61, for housing the X-ray tube and the electrical connections thereto. This hood or shield comprises a central cast annulus 62 having a pair of opposed pressed metal end bells 63 suitably secured thereto. The annulus 62 is formed with a radially disposed hub member 64 which is rotatably mounted on a bearing 65 secured to the support 48 (Figs. 5 and 16).

The hub member 64 is maintained against axial displacement from the bearing 65 by a ring 66 which is secured to the hub member 64 for engagement back of an annular flange 67 formed on the bearing 65. The amount of rotative movement of the container 61 is limited by a pin 68 carried by the hub 64 for abutting engagement with stop pins 69 carried by the bearing 65. The turning movement of the hood or shield 61 is resisted sufficiently to maintain it in its angularly adjusted positions by means of a plurality of coiled springs 71 (Fig. 21) which are disposed in recesses 72 formed in the hub member 64, and which urge shoes 73 into frictional contact with the adjacent face of the bearing 65.

The shield 61 houses an X-ray tube, indicated at 74, which includes the usual glass envelope 75 provided with a leaded glass casing 76 having an opening 77 therein, and with a radiator element 78 at the anode end and an electrostatic shield 79 at the cathode end thereof. This tube is mounted on brackets 81 of insulating or other suitable material, in operative position with respect to a window 82 provided in the annulus 62, which brackets 81 are carried by a plate 83 also of insulating material. The plate 83 in turn is mounted upon supports 84 suitably secured to the annulus 62 at a point diametrically disposed with respect to the window 82.

The end bells 63 are provided with apertures 85 at their ends (Fig. 4) to permit of the circulation of air through the shield so as to dissipate heat generated by the tube when the same is energized. A knob or handle 86 is provided on the annulus 62 by means of which the shield 61 and the X-ray tube assembly housed therein may be rotated about the axis of its support 48 for vertical or horizontal radiography or fluoroscopy, as will hereinafter be described.

The cathode (not shown) of the X-ray tube is supplied with electric current by a cable 87 containing leads 88 which emerge from the cable 87 in the vicinity of the tube. The exposed ends of the leads 88 are imbedded in a body of sealing wax 89 having a high melting point and contained within a cup 90 of bakelite or similar material secured to the plate 83 by means of a bakelite bolt 91. The cable 87 comprises a central core 92 of rubber or the like, in which the leads 88 are imbedded, a covering 93 of electrically conducting tape, and an outer sheathing 94 of metallic mesh (see Fig. 24).

The anode (not shown) of the X-ray tube is supplied with electric current of high potential by a cable 87a containing a single lead 88a which emerges from the cable 87a in the vicinity of the tube. The exposed end of this lead is imbedded in a body of sealing wax 89a contained within a bakelite cup 90a secured to the plate 83 by means of a bakelite bolt (not shown). The end of the lead 88a is electrically connected with a spring clip 95 which bears against the outermost fin of the radiator element 78 in radial alinement therewith. The cable 87a is constructed similarly to the cable 87 in that it also includes a central core 92a of rubber or the like, in which the lead 88a is imbedded, and outer coverings of conducting tape and metallic mesh 93a and 94a, respectively.

Before passing out of the shield 61, the cables 87 and 87a parallel the X-ray tube 75 for a short distance and at these points they are each provided with stress reducing cones 96 and 96a, respectively, to provide against corona at the points where the metallic sheathing and conducting tape terminate. These stress reducing cones each comprises a conical member 97 which is shown in Fig. 24 surrounding the core 92 of the cable 87, with its restricted end in contact with said core.

The conical member 97 is overlapped by the end of the covering 93 of the conducting tape and by the outer metallic mesh 94, both of which are in electrical contact with the member 97. The member 97, together with the overlapping ends of the tape 93, is imbedded in a body 98 of insulating material which also enters the flared end of the member 97 and effectively excludes air at this point. This exclusion of atmospheric air from the vicinity of the ends of the sheathing 94 eliminates the formation of corona, and the elimination of corona prevents any possibility of an electrical discharge at this point. The conical member 97 is in effect a flared continuation of both the conducting tape 93 and the metallic mesh 94, and prevents abnormal voltage gradients in the cable. The gradient of the surface voltage of the cable is thus rendered approximately uniform and the noise resulting from electrical discharges and spearking at the termination of the metallic mesh is thus eliminated.

The cables 87 and 87a extend entirely through the tubular support 48 and are maintained against relative movement or twisting therein in the following manner: An inner sleeve or tube 99 is rotatably mounted within the support 48 in slightly spaced relation thereto and is fixed at one end within the hub member 64 by a set screw 101. Secured within this end of the sleeve 99 is a relatively short spun tube 102, one end of which is flared outwardly, as indicated at 103, and having a pair of spaced segmental members 104 secured in the opposite end thereof. After the cables have been drawn through the inner sleeve or tube 99 and the spun tube 102, the latter is filled with sealing wax, indicated at 105, having a relatively high melting point, provided for the purpose of firmly gripping the cable without danger of crushing the cable or otherwise injuring its insulation.

The inner sleeve or tube 99, together with the cables 87 and 87a, is supported at the other end of the tubular support 48 by means of a clamping member 106 formed with a pair of spaced segmental extensions 107. These projections extend into the end of the sleeve 99 and are secured thereto by screws 108 which pass through a ring 109 for threaded engagement with the extension 107. The ring 109 is rotatably mounted on the end of the tubular support 48 and not only maintains the adjacent end of the sleeve 99 in spaced relation to the support 48 but also provides a bearing therefor. The end of the inner sleeve 99 is cut away, as indicated at 111, to permit the cables 87 and 87a to separate sufficiently to pass through a pair of spaced openings 112 formed in the clamping member 106.

The cables 87 and 87a, after emerging from the clamping member 106, are protected throughout the remainder of their length by armored sheeting 113, the upper ends of which are clamped in sockets 114 provided in the clamping member 106. It will be noted that the segmental extensions 107 of the clamping member 106 maintain the cables 87 and 87a in spaced parallel relation and effectually prevent them from twisting about each other at this point when the X-ray tube shield or hood 61 is rotated.

It will be apparent from the foregoing description that as the tube shield 61 is rotated the inner sleeve 99, together with cables 87 and 87a, rotate in unison and in accordance with the rotation of X-ray shield 61, thus eliminating any possibility of the cables twisting upon each other.

A downwardly formed channel member 115 is secured to a collar 116 carried by the end of the support 48 for the purpose of guiding the cables 87 and 87a downwardly as they leave the clamping member 196. Thence the cables curve upwardly and are connected to the terminals of the secondary winding of a transformer (not shown) which is mounted in a housing 117 carried by the base 21. The cables are supported by a curved bracket or rod 118 to which they are secured by clips 119.

The primary winding of the transformer is energized by electric current supplied through cables 121 leading to a control box 122 which in turn is connected to a suitable source of 220 volt alternating current by a cable 123. The control box 122 is provided with a line switch 124 and with various indicating instruments, including the usual ammeter, voltmeter, and controls 125, 126 and switch 127 respectively, and is pivotally mounted on the upper end of an arm 128 mounted at its lower end on the standard 27.

The weight of the X-ray unit and associated movable parts is counterbalanced by a spring or counterweight (not shown), which is disposed within the standard 26 and is secured to one end of a chain 129 which extends upwardly and over a sheave or pulley 131 journalled in a bracket 132 carried by the plate 28 and is secured at its other end between ears 133 provided on the casting 31.

Mounted on the standard 27 for vertical adjustment is a carriage (indicated generally at 134) which supports the fluoroscopic device, and includes in its construction a hemi-cylindrical casting 135, having guide rings 136 secured to its upper and lower ends which encircle the standard 27 and provided with a plurality of spaced anti-friction rollers 137 for engagement therewith (Fig. 6).

This carriage is prevented from rotating on the standard 27 by means of a horizontally extending arm 138 provided on the upper guide ring 136, and having a yoke 139 at its outer end provided with anti-friction rollers 141 for engagement with the opposite sides of the standard 26. The carriage 134 may be releasably secured to the standard 27 in any adjusted position by means of a clamping screw 142 which is threaded into one arm of a semi-circular member 143 straddling the standard 27 and pivotally mounted intermediate its ends between ears 144 formed on the casting 135.

Secured to the casting 135 is a bracket 145 formed with a horizontally extending hemi-cylindrical casting 146 (Figs. 2 and 4). Guide rings 147 are secured to the opposite ends of the casting 146 and are provided with anti-friction rollers 148 for engagement with a tubular longitudinally movable fluoroscope support 149 which extends horizontally through the guide rings 147 and casting 146, but in spaced relation to the latter.

The support 149 is prevented from rotating by means of a downwardly extending arm 151 (Fig. 4), the upper end of which is clamped to the support between the guide rings 147 and the lower end of which is bifurcated and provided with anti-friction rollers 152 for engagement with the opposite sides of a horizontal stationary guide bar 153 fixed at its ends to depending arms 154 formed on the guide casting 146 (Figs. 4 and 6).

A bracket 155 is fixed to one end of the support 149 and is formed with spaced bearings 156 which pivotally support the bifurcated end 157 of the horizontally extending arm 158. The outer end of this arm is provided with a vertical bearing 159 in which a horizontal bearing 161 is journalled (Fig. 2). Mounted in the bearing 161 is a stud shaft 162 (Fig. 1) which carries a pair of diverging arms 163 terminating in bearings 164, the axes of which are in alinement and which extend at right angles to a prolongation of the axis of the shaft 162. Journalled in the bearings 164 is a fluoroscopic device 165, embodying a frame 166 provided with operating handles 167 and supporting the usual fluoroscopic screen 168.

The arm 158 carrying the fluoroscopic device 165 may be releasably secured either in the position shown in Fig. 1 or in that shown in Fig. 2 by means of a pin 169 which is carried by the arm 158 for engagement with sockets 171 and 172, respectively, provided in the bracket 155. The purpose of this adjustment will hereinafter be explained fully in connection with the operation of the apparatus.

The weight of the fluoroscopic device 165 and associated parts is counterbalanced by a weight (not shown) which is disposed within the hollow standard 27 and which is secured to one end of a chain 173 which extends upwardly and over a pulley 174 journalled in the bracket 132 and at its other end between ears 175 provided on the casting 135.

From the foregoing description it will be apparent that if it is desired to obtain radiographs of a patient lying in bed or on a suitable table, it is only necessary to adjust the carriage 29 and the X-ray unit 61 to the desired height and to rotate this unit to its horizontal position shown in Fig. 3 and then to position the apparatus beside the bed or table with the X-ray unit overhanging the patient. In such case the sensitized plate is suitably positioned beneath the patient.

If it is desired to employ the apparatus for vertical radiography, that is with the patient occupying an upright position, the X-ray unit 61 is turned through an arc of 90° to the position shown in full lines in Fig. 1, at the front, rear or side of the patient, and then adjusted to the proper height. In such case a suitable plate holder (not shown) is provided on the opposite side of the patient.

If, however, it is desired to employ the apparatus for vertical fluoroscopy, the X-ray unit 61 is turned through an arc of 180° from the position shown in full lines in Fig. 1 to that indicated by dotted lines in this figure. The arm 158 is then swung to the position shown and locked by means of the pin 169. The fluoroscopic device 165 is then rotated about the axis of the bearing 164 to the vertical position shown.

When the apparatus is thus employed for fluoroscopic examination, it is desirable to have the fluoroscopic screen and X-ray units move vertically in unison. To this end the carriages 29 and 134 may be releasably interlocked to move together vertically on the standards 26 and 27 when force is applied to either. This is accomplished by providing a latch 176 (Figs. 6 and 7), which embodies a shaft 177 slidably and rotatably mounted in bearings 178 and 179 carried by the arm 34 of the lower guide ring 32 of the carriage 29. This shaft registers with a groove 181 provided in a depending stud 182 carried by the lower guide ring 136 of the carriage 134. The shaft 177 is provided with a transversely extending pin 183 for abutting engagement with opposite sides of the bearing 179, which bearing is formed with a slot 184 in its upper edge corresponding in width to that of the pin 183.

Referring to Fig. 7, if it is desired to interlock the carriages 29 and 134, the shaft 177 is rotated by means of a knurled thumb piece 185 until the pin 183 registers with the slot 184. The shaft is then slid axially into engagement with the groove 181 in the stud 182. Thereafter the shaft is again rotated sufficiently to move the pin 183 out of alinement with the slot 184 and to a position where it will engage the opposite side of the bearing 179 to prevent accidental displacement of the shaft 177 from the groove 181. The above-described mechanism effectively interlocks the X-ray unit and fluoroscopic device for vertical movement in unison.

It is also desirable to interlock these instrumentalities with regard to horizontal movement when the apparatus is employed for both horizontal and vertical fluoroscopy. This is accomplished by providing an upwardly extending arm 186 fixed to the end of the support 149 opposite the fluoroscopic device 165, and formed with a tubular portion 187 in which one end of a rearwardly extending, horizontally disposed tube 188 is fixed. (Figs. 2, 4 and 8). A plug 189 is fixed in the opposite end of this tube and is formed with an axial bore in which a pin 191 is slidably mounted (Fig. 9). Disposed within the tube 188 and surrounding the pin 191 between a washer 192 and the inner end of plug 189, is a coiled spring 193 which yieldably urges pin 191 inwardly. The inward movement of this pin is limited by a cross pin 194 carried thereby for engagement with a pair of transversely extending slots 195 formed in the outer face of plug 189.

The portion of pin 191 which projects outwardly from plug 189 is provided with an eye 196 and is flattened, as indicated at 197, for engagement with a bore 198 provided in a knob 199 fixed to the upper end of a vertically extending rod 201. When it is desired to disconnect rod 201 from tube 188, eye 196 is grasped and the pin retracted against the action of spring 193 until cross pin 194 is disengaged from slot 195. The pin is then rotated until the flattened portion 197 is in registration with a slot 202 formed in knob 199, after which the rod 201 may be lowered from engagement with pin 191.

The lower end of rod 201 extends through a guide 203 fixed to the collar 116 carried by the end of the X-ray unit support 48 and is provided with a plurality of anti-friction rollers 204. A rubber washer 205 is provided on the rod 201 between the knob 199 and the guide 203 and forms a cushioned seat for rod 201 upon the guide 203 when rod 201 is disconnected and lowered.

When the tube 188 and rod 201 are connected as above described and as shown in Figs. 2 and 4, lateral movement of the fluoroscopic device 165 will be transmitted through the support 149 and arm 186 to tube 188 and thence through the rod 201 to the X-ray supporting tube 48. It will be noted, however, that the sliding connection between the rod 201 and the support 48 afforded by the guide 203 permits the fluoroscope device 165 to be adjusted vertically without transmitting any motion to the X-ray unit when the apparatus is employed for horizontal fluoroscopy (Fig. 4), but when the apparatus is employed for vertical fluoroscopy, the fluoroscopic device 165 with the X-ray unit 61 moving in unison therewith, may be moved freely in a lateral direction. This interlocking mechanism, together with that afforded by the latch 176 between the carriages, results in a flexibility of movement of wide range, such as will permit of a fluoroscopic examination of the entire human body.

The above described combined X-ray and fluoroscopic apparatus constitutes a complete and operative structure in itself, but, if desired, it may be employed in connection with an adjustable and convertible table where the conditions are such as to permit of such joint use, as for example in an office or laboratory. Such a combined and permanent installation is illustrated in Figs. 1, 2, 3 and 4, wherein the table is shown as comprising a hollow cast metal base 206 (Fig. 14) provided with two extensions 207 and 207a on one side and a single extension 208 on the other side intermediate its ends.

The extension 207a and the extension 208 are provided with smooth rollers 209 for contact directly with the floor, and the extension 207 is provided with a grooved roller 211 for engagement with a flanged rail 212. This rail extends parallel to the rail 23 of the X-ray and fluoroscopic apparatus and is secured to the floor and also to the rail 23 by castings 213 which also function as bumpers at each end of the rails. A grooved guide roller 214 is mounted in a housing 215 carried by a relatively heavy leaf spring 216 secured to the base 206. This guide roller traverses the rail 212 and is maintained on said rail by the leaf spring 216. It will be apparent from this construction that should either of the rollers 209 encounter a hollow or other irregular spot in the floor as the base 206 is moved longitudinally of its rail 212, the leaf spring will urge the guide roller 214 toward the rail and maintain its contact therewith to insure that the base 206 travels in parallelism with the rail under all floor conditions.

The base 206 is further provided with a pair of upwardly extending side members 217 which are preferably cast separately from the base 206 and suitably secured thereto. The side members 217 are secured together adjacent their upper ends by a tie rod 218 and are formed at their upper extremities with bearings 219 in which are journalled trunnions 221 formed on vertically swinging guide members 222 of channel construction. These guide members constitute the support for one end of a table, indicated generally at 223, which comprises a flat wooden panel 224 having metal straps or side rails 225 secured to its longitudinal side edges. The side rails 225 are of greater depth than the panel 224 to provide clearance between the lower face of the panel and the lower flanges of the guide members 222 (Fig. 26) in which the side rails 225 of the table are mounted for longitudinal sliding movement. The opposite end of the table 223 is supported by a pair of transversely folding legs 226 which are pivotally mounted at their upper ends in brackets 227 secured to the bottom of the table.

A Bucky diaphragm of the usual commercial type and indicated in its entirety at 228, is mounted beneath the panel 224 for co-operation with the X-ray unit. This diaphragm comprises a sheet metal drawer 229 adapted to hold a sensitized plate, which drawer is supported by a frame or tray 231. According to the present invention the frame 231 is provided with rollers 232 on opposite sides for engagement with a channel 233 secured to the under side of the panel 224 and the inner face of the side rails 225.

An arm 234 is hinged at one end to the underside of the frame 231 of the Bucky diaphragm, and is provided with a yoke 235 at its opposite end for releasable engagement with the standard 26 (Fig. 2) to prevent accidental displacement of the Bucky diaphragm and the sensitized plate carried thereby when the apparatus is employed for radiography. When not so used the arm 234 may be folded back to an inoperative position beneath the frame 231, as shown by the dotted lines in Fig. 2. The described construction permits the Bucky diaphragm to be quickly and easily shifted longitudinally of the table to an inoperative position when the apparatus is employed for fluoroscopy.

A roll of cloth 236, or other suitable material, is mounted at one side of the table 223 so that a strip of such material may be drawn across the table and over the patient to hold the patient immobile.

The table is locked in the extended position shown in Figs. 2 and 3 by means of latches, indicated generally at 237, carried by the guide members 222 for engagement with the side rails 225 of the table. These latches are of a two-position type and each is illustrated in Fig. 25 as embodying a stem 238 which is both slidably and rotatably mounted in a boss 239 formed on the guide member 222. The stem 238 is provided with a collar 241 at its inner end, which carries a pair of diametrically spaced pins 242 for engagement with a pair of horizontally disposed spaced apertures 243 provided in the side rail 225 of the table. The outer end of the stem 238 is formed with a squared portion 244 which slidably engages a square opening 245 provided in a cap 246 which is threaded onto the boss 239. The latch is urged inwardly by a coil spring 247 which surrounds the stem 238 between the collar 241 and the cap 246 and may be operated against the action of this spring by a knob or handle 248 secured to the outer end of the stem 238.

When it is desired to employ the apparatus for vertical radiography or fluoroscopy, as previously described, the latches 237 are first retracted to disengage the pins 242 from the apertures 243, which movement also disengages the squared portions 244 of the stems 238 from the squared openings 245 in the caps 246. The latches are then rotated 90 degrees or until the pins 242 assume vertical positions, whereupon they are released, permitting the squared portions 244 to reenter their squared openings 245 but displaced one-quarter turn with respect to their initial positions. In this position of the latches the inner ends of the pins 242 bear against the side rails 225 of the table and are maintained against rotary displacement. The table 223 is then slid longitudinally through the guides 222 until a second pair of apertures 249 located near the transverse center line of the table and which are disposed one above the other, register with the pins 242 and are engaged thereby under the action of the spring 247.

The advantage of the above described construction is that the latches 237 may be operated separately and then released without having them reengage their apertures. Also, they may be turned to a position from which they cannot be displaced while the table is being moved longitudinally. The table 223 and the parts carried thereby are then swung upwardly about the axis of the trunnions 221 to the position shown in full lines in Fig. 1, and the legs 226 folded inwardly. The table is releasably maintained in its vertical position by a spring operated latch 251 carried by the base 206 for engagement with a flange 252 carried by the adjacent end of the table, and released by a foot operated plunger 253.

The Bucky diaphragm 228 is supported or counterbalanced in its adjusted position when the table occupies a vertical position, by a flexible steel strap 254, one end of which is secured to the frame 231 of the Bucky diaphragm and the other end of which is wrapped around a spring controlled spool mechanism 255 mounted at the upper end of the table. If the apparatus is to be employed for vertical fluoroscopy, the fluoroscopic device 165 and the X-ray container 61 of the X-ray unit are swung to the position shown by the dotted lines in Fig. 1, at the front and rear of the patient.

If, on the other hand, it is desired to obtain X-ray pictures of any particular portion of the patient's body, the table 223, which in this case functions as a plate holder, is moved along its rail 212 to the position shown in full lines in Fig. 1. The unit 61 is then turned about its axis to its reverse vertical position (indicated in full lines in Fig. 1), and the entire apparatus shifted along its rail 23 to the position shown. When the apparatus is thus employed, the fluoroscopic device 165 is swung to an inoperative position out of alinement with the X-ray unit.

The base 206 of the table 223 is locked in a desired adjusted position by a spring operated latch 256 which is slidably mounted in a guide 257 for releasable engagement with longitudinally spaced, recessed stops 258 located along the rail 212. This latch may be retracted by a manually operated lever 259 fixed to a shaft 261 journalled in the base 206, and provided with an arm 262 for engagement with a transversely extending pin 263 carried by the latch 256 (Fig. 15).

In a similar manner the X-ray apparatus may be locked in its longitudinally adjustable position by means of a latch 264 mounted in a casing 265 carried by the base 21, and urged downwardly by a spring 266 for engagement with any one of a series of longitudinally spaced, recessed stops 267 provided in the rail 23 (Figs. 12 and 13). The latch 264 is provided with a roller 268 which rides upon a segment 269 pivotally mounted in the casing 265 and provided with an operating lever 271. The segment 269 is also provided with a depressed portion 272 having inclined sides and flat portions 273 at each side thereof adapted to support the roller 268 with the latch 264 in its retracted position. When it is desired to release the latch 264, the segment is rotated by the handle 271' in a clockwise or counter-clockwise direction, indicated by the arrows in Fig. 12, which causes the cam surface of the depression 272 to elevate the latch out of engagement with the stop 267.

It is sometimes desirable to maintain the X-ray apparatus in some adjusted intermediate position where no stops have been provided in the rail. This is accomplished by a yieldable brake or drag comprising a relatively strong leaf spring 274 fastened at one end to the under side of the base 21 which carries a shoe 275 at its free end for frictional engagement with the rail 23. The spring 274 is urged downwardly in order to effect the engagement of the shoe 275 with the rail, by means of a pin 276 slidably mounted in the base 21 and forced downwardly by a cam surface 277 provided on the lower face of the segment 269, when this segment is rotated in a clockwise direction, indicated by the arrows in Fig. 12.

Obviously, the X-ray and fluoroscopic apparatus may be employed independently of the table structure and when so employed may be mounted on suitable casters.

From the foregoing it will be apparent that a very complete and flexible combined X-ray and fluoroscopic apparatus is provided which employs but a single X-ray tube for the many described purposes and one in which the several adjustments and operations may be effected quickly and easily with the greatest degree of safety to the operator and patient.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an X-ray machine, the combination of an X-ray tube, a housing for the same, a carrier for the housing, a support on which said carrier is mounted, flexible insulated conductors extending to the terminals of the X-ray tube, said conductors being supported in the carrier, and means for preventing twisting of the flexible insulated conductors relatively to each other and to the carrier in the interior of the same.

2. In an X-ray machine, an X-ray tube, a supporting member upon which said tube is rotatably mounted, flexible insulated conductors extending through said supporting member to said tube, and means for maintaining said flexible conductors within said supporting member in predetermined relation to each other during rotation of said tube relative to said supporting member.

3. In an X-ray machine, the combination of an X-ray tube, a housing for the same, a tubular carrier for said housing, the housing being rotatably adjustable relatively to said carrier, flexible insulated conductors for the X-ray tube extending through said carrier into the housing and to the terminals of the tube mounted therein, and means for forcibly imparting rotation to said conductors at both ends of the carrier upon rotary adjustment of the housing relatively to the carrier.

4. In an X-ray machine, the combination of an X-ray tube, a housing for the same, a straight tubular carrier for the housing, a support on which said carrier is vertically and horizontally adjustable while being held against rotation about its axis, the housing and tube carried thereby being rotatable relatively to the carrier, flexible insulated conductors located in the carrier and extending into terminals of the tube in the housing, a guide tube for said conductors in the interior of the carrier, means for securing said conductors relatively to the guide tube, and means for fixedly connecting said guide tube to said housing, whereby upon rotation of said housing, said guide tube and said conductors over their entire length supported in the carrier are rotated about the axis of the carrier without being twisted relatively to each other.

5. In an X-ray machine, the combination of an X-ray tube, a housing for the same, a carrier for the housing, a support on which said carrier is adjustably mounted, flexible insulated conductors supported in said carrier and extending into the housing to the terminals of the tube, a guide tube rotatably secured within the carrier and supporting the insulated conductors, and means for fixedly connecting the guide tube to the housing, the housing being rotatable relatively to the carrier, said conductors being secured to the guide tube at the two ends thereof, while the intermediate length of the conductors is unsupported within said guide tube.

6. In an X-ray machine, the combination of an X-ray tube, a housing for the same, a carrier for the housing, a support on which said carrier is adjustably mounted, the housing being rotatable relatively to the carrier, flexible insulated conductors extending through said carrier into the housing to the terminals of the tube, and means connected with the housing for maintaining said flexible conductors within the carrier in predetermined relation to each other.

7. In an X-ray machine, the combination of an X-ray tube, a housing for the same, a carrier on which said housing is rotatably mounted, a support on which said carrier is adjustable, flexible insulated cables extending through said carrier into the housing to the terminals of the tube, a guide tube fixedly connected with the housing and extending through said carrier, said guide tube having in its interior section elements confined by a chord and the circumference of the tube for maintaining the cables within the tube in predetermined relation to each other.

8. In an X-ray machine, the combination of an X-ray tube, a housing for the same, a tubular carrier on which said housing is rotatably mounted, a support on which said carrier is adjustable, insulated conductors extending through said carrier into the housing and to the terminals of the tube, a guide tube fixedly connected with the housing and extending through the carrier, means within said guide tube for maintaining the conductors in predetermined relation to each other regardless of the rotation of said tube relatively to the carrier, said tube being provided with a flaring end where it enters the housing, and a compound filling the space about the conductors within said guide tube adjacent said flaring end.

9. In an X-ray machine, the combination of an X-ray tube, a housing for the same, a tubular carrier on which said housing is rotatably mounted, a guide tube fixedly connected to the housing and disposed within the carrier and projecting therefrom, insulated conductors extending through said guide tube, means for maintaining the insulated conductors spaced from each other inserted in the projecting end of the guide tube, and means for holding said spacing means against axial displacement relatively to the carrier.

10. In an X-ray machine, the combination of an X-ray tube, a housing for the same, a carrier on which said housing is rotatably mounted, a support on which said carrier is adjustably located and secured against rotation about its axis, flexible insulated conductors extending through the carrier into the interior of the housing and to the terminals of the tube, and means for guiding said flexible insulated conductors exteriorly of the carrier to prevent them from twisting when said housing is rotated relative to said carrier.

11. In an X-ray machine, the combination of an X-ray tube, flexible insulated conductors extending to the terminals of the tube, and stress reducing sheet metal cones surrounding the insulation of said conductors adjacent the terminals of the tube, said cones being imbedded in a body of insulating material.

12. In an X-ray machine, the combination of an X-ray tube, flexible insulated conductors extending to the terminals of the tube, stress reducing metal cones surrounding the insulation of the conductors adjacent the terminals, and flexible metal reinforcements surrounding said cones, said cones and reinforcements being imbedded in a body of insulating material.

13. In an X-ray machine, the combination of an X-ray tube, flexible insulated conductors extending to the terminals of the tube, stress reducing metal cones surrounding the insulation of said conductors adjacent the tube, a tape of conductive material wound about said cones, and flexible metal reinforcement applied over the conductive tape of the cones, said cones, tape and metal reinforcement being imbedded in insulating material.

14. In an X-ray machine, the combination of an X-ray tube, flexible insulated conductors extending to the terminals of the tube, stress reducing metal cones surrounding the insulation of said conductors adjacent the terminals and flaring in a direction away from said conductors, and means for preventing the entry of air into said cones about said insulation.

15. In an X-ray machine, the combination of an X-ray tube, a housing for the same, a carrier on which said housing is rotatably mounted, the housing comprising an annular member having means for rotatable attachment to the carrier and also being provided with an exposure window in angular relation to said attachment means, and cylinders secured to said annular member at both sides of the same.

16. In an X-ray machine, the combination of an X-ray tube, a housing for said tube, a vertical supporting structure, a bracket slidable on said vertical structure, and a carrier for said housing, said carrier being slidable transversely to said supporting structure in the bracket and being oscillatable about a pivot pin on the bracket regardless of its longitudinal adjustment relatively to the bracket.

17. In an X-ray machine, an X-ray tube, a fluoroscopic screen, means for supporting said tube and said screen and normally permitting relative movement therebetween, and locking means for interconnecting said tube and screen to prevent relative horizontal movement while permitting relative vertical movement therebetween.

18. In an X-ray machine having a support, an X-ray tube mounted on said support, and a table movable relative to said support; a member movably mounted on said table, and means for locking said member to said support, said means permitting movement of said table relative to said support.

19. In an X-ray machine having a track structure adapted to be placed on a floor, a table adjustable longitudinally of said track structure, a support, and an X-ray tube adjustably mounted on said support; a member mounted on said table for movement longitudinally relative thereto, and means for locking said member to said support, the locking means being independent of the adjustment of the table longitudinally of the track.

HERMAN G. FISCHER.
PETER P. MUSKET.
HOWARD H. OSBORN.